United States Patent [19]
Pryor

[11] 3,797,939
[45] Mar. 19, 1974

[54] DIFFRACTOGRAPHIC MEASUREMENT OF PROFILE

[76] Inventor: Timothy R. Pryor, 5423 York Ln., Bethesda, Md. 20014

[22] Filed: May 23, 1972

[21] Appl. No.: 256,099

Related U.S. Application Data

[63] Continuation-in-part of Ser. No. 253,421, March 15, 1972, which is a continuation-in-part of Ser. No. 751,615, Aug. 8, 1968, Pat. No. 3,664,739.

[52] U.S. Cl............... 356/111, 356/109, 356/159
[51] Int. Cl. ............................................. G01b 9/02
[58] Field of Search ........................... 356/106–113, 356/159

[56] References Cited
UNITED STATES PATENTS
3,518,007   6/1970   Ito....................................... 356/159

OTHER PUBLICATIONS
"Multiple Wavelength . . . Surfaces," 51 Josa 1142, Herriott.

*Primary Examiner*—John K. Corbin
*Assistant Examiner*—Conrad Clark
*Attorney, Agent, or Firm*—Larson, Taylor and Hinds

[57] ABSTRACT

A method and apparatus for dimensional gaging of object profiles is disclosed. A boundary of the tested member is located adjacent a reference member to provide, on illumination with essentially monochromatic and space coherent electromagnetic radiation, an interference pattern whose intensity distribution is a function of the relative positions of the members. Analysis of these interference patterns gives the profile of the tested member.

38 Claims, 7 Drawing Figures

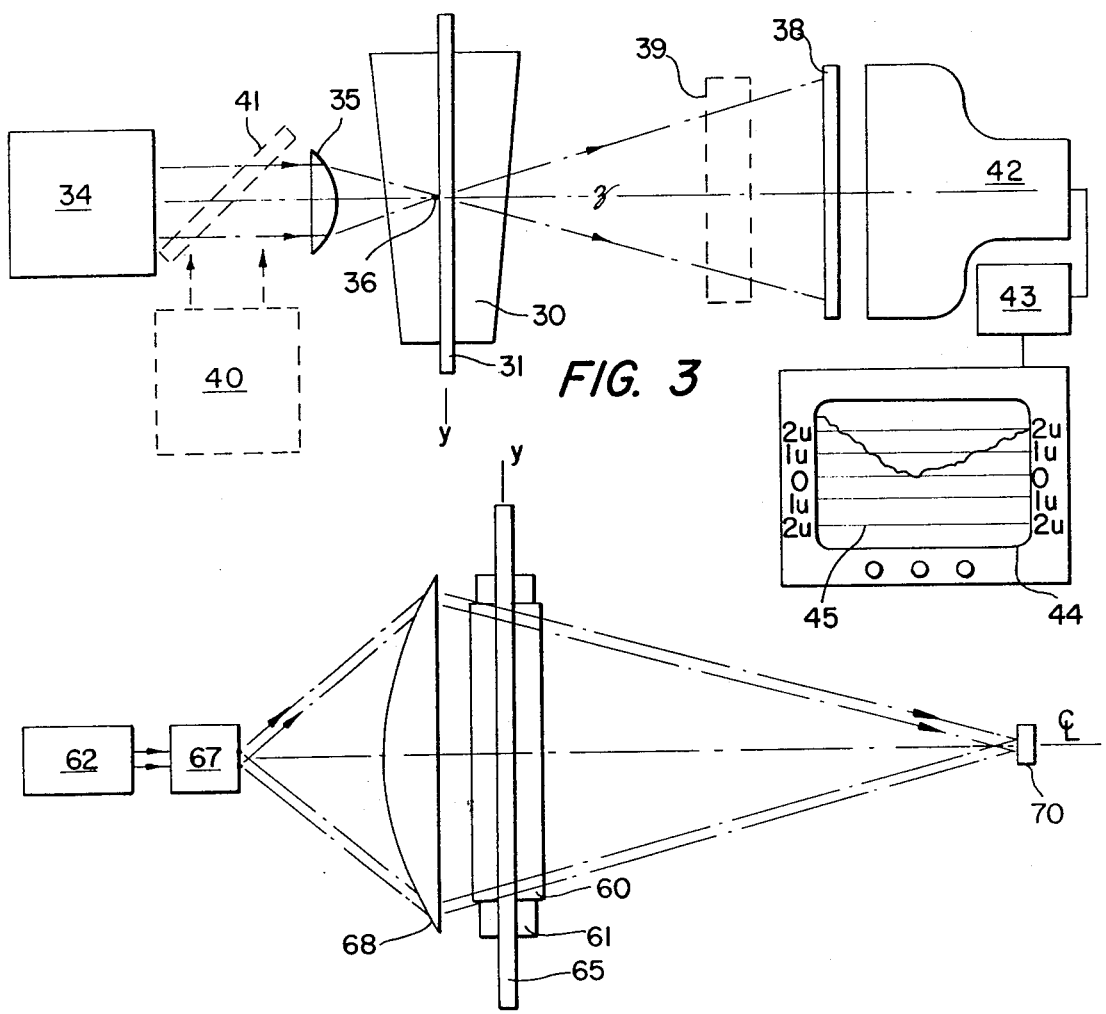
FIG. 3
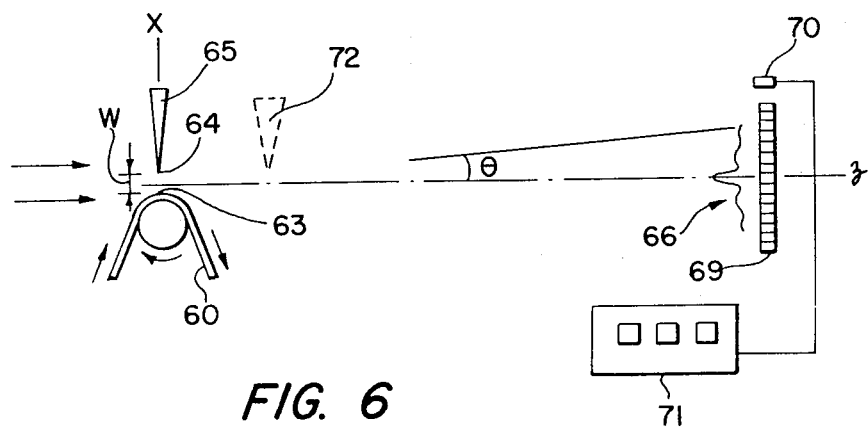
FIG. 5
FIG. 6

DIFFRACTOGRAPHIC MEASUREMENT OF PROFILE

This application is a continuation-in-part of my copending application Ser. No. 253,421, filed May 15, 1972, which is, in turn, a continuation-in-part of my earlier application Ser. No. 751,615, filed Aug. 8, 1968, now U.S Pat. No. 3,664,739 issued May 23, 1972.

BACKGROUND OF THE INVENTION

This invention relates to a method and apparatus for determining the profile of an object. More particularly, the invention relates to such method and apparatus involving the utilization of interference patterns formed by directing electromagnetic radiation at first and second diffraction wave producing means.

Accurate, reliable measurement of object profiles and contours is of vital interest to industry, and a wide variety of apparatus exists for this purpose. There are essentially two types commonly used for accurate measurements:

1. Optical Projectors, which project a magnified image of a part or section of a part on a viewing screen;
2. Devices which scan a displacement sensor (air gage, dial gage, LVDT, etc.) over the part in question, relating its output as a function of distance moved to part profile or contour. Equivalently, the part may be moved past a fixed sensor head, or a multiplicity of sensing heads may be incorporated to determine the relative positions of discrete points on the object in an essentially simultaneous manner, obtaining an approximate profile.

Several problem areas exist with these present techniques. For example, the magnification employed in the optical projector to allow an operator to examine object profiles is limited by the field size and depth of focus required by the object measured. Considerable operator training is required and measurement accuracy seldom exceeds three microns on any reasonably sized object. Accurate, automatic measurement is thus difficult, if not, impossible. To its credit however, the optical projector allows arbitrary objects to be measured in a non-contacting manner, producing a total profile image of the part or part section.

Point detection gages may be either of the contacting or non-contacting type and allow construction of semi or full-automatic measurement systems. However, all require frequent calibration (especially those for which high sensitivity is claimed) and none can produce a complete profile image, even when large numbers are used. In addition, the accuracy-range product of virtually all electronic or air gages in common use is rather poor, and none produce an intrinsically digital or quasi-digital output.

Generally speaking, the best such point gaging systems require contact with the object which may lead to errors due to contact pressure difficulties. The widely used, and non-contacting air gage does not have this trouble, but requires a relatively large air contact zone and possesses many idiosyncracies.

In the field of stress analysis, it is often of interest to study the deflection of a member under load, and if small, easily loaded laboratory models of structures are to be used, the required accuracy in determining the deflected object shape is very high. Holography has recently come into vogue for this purpose, as well as for related non-destructive testing uses. While an elegant technique, it is difficult to use, and may only be done under the most carefully controlled conditions, usually precluding the study of actual engineering prototypes in the field.

Accordingly, it is an object of this invention to provide means by which object profiles can be measured in a highly accurate, non-contacting and quasi-digital manner, without requiring frequent calibration.

It is another object of the invention to provide means for displaying a visually or otherwise interpretable pattern proportional to the profile of an object.

It is a further object of the invention to provide means by which profile patterns can be generated proportional to an object profile in three dimensions.

It is even further an object of the invention to provide a system by which extremely rapid and fully automatic accurate profile measurement may be accomplished.

It is still a further object of the invention to provide a method for easily obtaining with high resolution the profile of members deflected due to loads or other causes.

BRIEF SUMMARY OF THE INVENTION

The foregoing and other objects which will be apparent to those having ordinary skill in the art are achieved according to the present invention by providing a method of determining the profile of an object boundary comprising the steps of providing a reference diffraction wave producing means, locating an elongate object boundary diffraction wave producing means, directing electromagnetic radiation at the reference diffraction wave producing means and a first discrete portion of the objects boundary diffraction wave producing means to form a first, single, interference pattern caused by interaction of waves diffracted from the reference diffraction wave producing means and the object boundary diffraction wave producing means, directing electromagnetic radiation at the reference diffraction wave producing means and a second discrete portion of the object boundary diffraction wave producing means to form a second, single, interference pattern caused by interaction of waves diffracted from the reference diffraction wave producing means and the object boundary diffraction wave producing means, and comparing the first and second single interference patterns to determine the profile of the object boundary. Apparatus according to the invention comprises reference diffraction wave producing means, elongate object boundary diffraction wave producing means, means for directing electromagnetic radiation at the reference diffraction wave producing means and a first discrete portion of the object boundary diffraction wave producing means to form a first, single, interference pattern caused by interaction of waves diffracted from the reference diffraction wave producing means and the object diffraction wave producing means, means for directing electromagnetic radiation at the reference diffraction wave producing means and a second discrete portion of the object boundary diffraction wave pro-ducing means to form a second, single, interference pattern caused by interaction of waves diffracted from the reference diffraction wave producing means and the object diffraction wave producing means, and means for comparing the first and second, single, interference patterns to determine the profile of the object boundary.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

FIG. 3 is a diagrammatic plan view of an embodiment of the invention wherein a microprofile of a small region of an object surface is obtained;

FIG. 5 is a diagrammatic plan view of an embodiment according to the invention profiling moving sheet products;

FIG. 6 is a diagrammatic side elevation of a portion of the embodiment of FIG. 5.

The present invention involves a method by which object profiles may be obtained in a highly accurate, rapid, and easily interpretable manner using the interference pattern formed when incident electromagnetic waves diffracted at various positions along the test object boundary interfere with waves diffracted from one or more positions of an adjacent reference diffraction wave producing means, itself usually comprising the boundary of a member.

A wide variety of detection means are disclosed in my application Ser. No. 253,421, filed May 15, 1972 and several will be referred to here. In addition, said application contains a full description of the various types of diffraction wave producing means which may be used as a reference for example objects with two boundaries, diffraction gratings, etc. To simplify this application however, the only such means to be illustrated herein is a diffracting boundary of a member, hereafter referred to as the reference boundary. Such diffraction wave producing means generally provide the best interference pattern for measurement purposes, when used in conjunction with a boundary of a test object, and are thus preferred.

In many cases, the reference boundary is straight, and when the object boundary is reasonably straight and parallel to the reference the interference pattern formed due to the interaction of diffracted waves from two points, one on each boundary, becomes that commonly called a "single slit Fraunhofer diffraction pattern." It is because of this, that I employ the name "diffractographic" to describe this technique. However, the pattern formed by the interaction of such diffraction waves is technically best described as an interference pattern and it is thus described herein.

Figure 1:
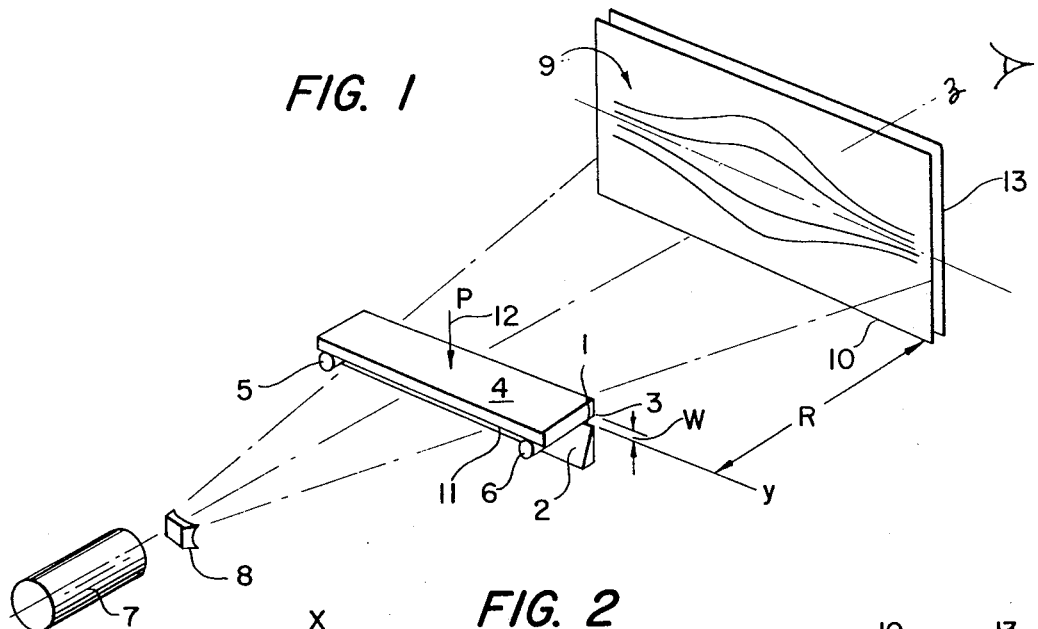
FIG. 1 is a diagrammatic perspective view of an embodiment of the invention producing a profile interference pattern corresponding to a member deflected under load.
Figure 2:
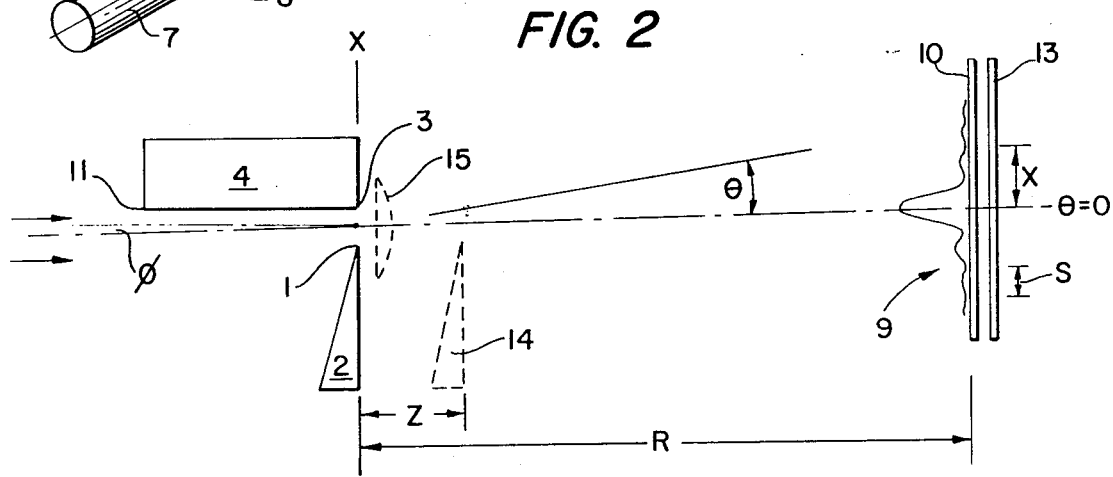
FIG. 2 is a diagrammatic side elevation of a portion of the embodiment of FIG. 1.

One embodiment of the invention is illustrated in FIGS. 1 and 2.

A straight edge reference boundary 1, of object 2 is placed next to an edge 3 of a 20 cm long beam 4, resting on supports 5 and 6 such that a slit of width $w$ is formed between the reference edge and edge 3 of the unloaded, and initially straight, beam 4. It is desired to obtain a deflection profile of beam 4. On illumination by monochromatic electromagnetic radiation of wavelength $\lambda$ from gas laser 7, which is spread in a fan by cylinder lens 8, covering the entire slit length equal to the object length of interest, a Fraunhofer type interference pattern 9 is produced on screen 10 located a distance R from the slit, R being much greater than the slit width $w$. As shown in FIG. 2, the reference boundary is adjacent one edge of the beam, and the incident radiation is inclined at a small angle $\phi$ typically 2°, such that little or no light is diffracted by the edge 11.

As is well known, the interference pattern produced has an intensity distribution given by $$I = I_0(\sin^2 B/B^2) \tag{1}$$

where $I_0$ is the intensity on the $\theta = 0$ axis, and $$B = (\pi w/\lambda) \sin \theta \tag{2}$$

Consideration of equations (1) and (2) reveals that zeros of intensity or fringe minima occur everywhere $$w \sin \theta = n\lambda \tag{3}$$

In the region of small angles $\theta$ where most of the diffracted radiation is concentrated, the fringes are equally spaced, with spacing $$s = R\lambda/w \tag{4}$$

and the position of any particular minima is $$x_n = nR\lambda/w \tag{5}$$

where $n$ is the fringe order number, and $R$ is the slit to screen distance.

If the beam and reference are straight and adjusted parallel, the fringes of the resultant pattern will initially be likewise, with $s$ and $x_n$ values as in (4) and (5) above. However, when a central point load 12 is applied, the beam deflects toward reference 1 and slit width w becomes a function of position along the slit. Accordingly, the spacing and location of the fringes becomes a function of position and a greatly exaggerated "picture" of the deflection results which may be viewed by eye, photographed or electronically detected. The change in boundary separation between two positions along the slit becomes $$\Delta w = nR\lambda[(1/x_{na}) - (1/x_{nb})] \tag{6}$$

And changes in fringe position may be expressed as $$x_{na} - x_{nb} = Rn\lambda[(1/w_a) - (1/w_b)] \tag{7}$$

wherein the notation *a* represents one position and the notation *b* represents the other position.

I have found that a value $\Delta w$ of 0.3 microns can typically be resolved by visual observation of the pattern fringe locations, and that considerably better results can be obtained when simple photodetection systems are used. When coupled with a typical range of $\Delta w$ of several millimeters, this is an outstanding performance — especially considering that an inexpensive He-Ne gas laser used as the wave source constitutes the only significant cost.

While it is not necessary to have the two edges initially parallel, doing so allows an immediate qualitative appraisal of where the maximum deflection lies, as well as the relative points of interest. In any case, deflection at any location along the beam can be determined by analysis of the before and after interference patterns, in the region corresponding to the beam location chosen.

This technique has proven of great value in engineering studies of structural members, since the aforementioned range, accuracy, stability and non-contacting nature of the technique can now be applied along a whole line at once.

Several experiments to date have been done using visual observation of fringe positions, accomplishing the measurement of x or s with dial calipers or other linear measurement instrument. Details of such suitable visual measurement techniques are discussed in my application Serial No. 253,421, filed May 15, 1972, along with non-visual techniques such as the use of photoelectric means for determining fringe position or spacing. Shown in FIGS. 1 and 2 is another technique by which the interference pattern may be filtered by filter 13, which is a negative transparency of the pattern existing in the no load condition. As mentioned in my application Ser. No. 253,421, filed May 15, 1972, moire fringes are immediately formed when load is applied, due to the interaction of the stored "before" pattern and the "after" pattern resulting due to the load. The spacing of the moire fringes is proportional to defelction, not *w*, and a deflected moire profile fringe pattern is therefore produced which immediately gives the maximum deflection positions, even if the reference and object boundaries are not initially straight. When the moire technique is used, it is often advantageous to use a lens to form the pattern, since centerline shifts produce false moire fringes.

As shown in FIG. 2, the reference boundary may be displaced in the z direction, as represented by object 14 shown in dotted lines. While an assymmetrical interference pattern results, somewhat complicating detection, two desirable characteristics accrue. First, clearance may be provided between members, and second, profile information is obtained in both *x* and *z* directions at a multitude of positions in the *y* direction. Thus the two-dimensional profile pattern produced is in fact proportional to all three coordinates of the object, and measurement of the pattern fringe positions gives all three values. This is a unique capability of the invention. Interference pattern interpretation details are given in my application Ser. No. 253,421, filed May 15, 1972.

It is generally preferred that incident electromagnetic waves be substantially monochromatic and of sufficient spatial coherence between waves hitting each boundary to produce the required number of fringes and fringe contrast for the detection system used. Spatial coherence need not be maintained along the slit in the *y* direction, however.

As is obvious from FIGS. 1 and 2, cylinder lens 8 provides a magnification in the *y* direction of the object length illuminated. When this is not desirable, a further cylinder lens can either collimate or demagnify the pattern in the *y* direction as desired. Where film or visual detection is used, a complete profile pattern may be generated by replacing lens 8 with a scanner and scanning the laser beam down the object boundary at a sufficient rate. Indeed such a scan system may be desirable in those cases where measurement is made of fringe positions, since such measurement is usually performed at only one y location at a time. Considerably more efficient utilization of source power results.

While measurement of change in fringe minima position is the most often used mode of profile determination when visual detection is used, several other interference pattern relationships may be used as well. For example, fringes are equally spaced in the small angle region and the change in same is given by $$s_1 - s_2 = R\lambda[(1/w_a) - (1/w_b)]$$

(8)

The inverse of fringe spacing, fringe frequency, *f*, varies linearly with changes in slit width and is given by $$f_1 - f_2 = R\lambda (w_a - w_b)$$

(9)

The simplicity of the above equations together with the simply generated and easily read profile interference pattern allows profile variations as small as 0.1 micron to be resolved using visual detection and commonly available low powered gas laser sources. When higher power sources and/or photoelectric detection means are employed, error in profile measurement may be reduced to 0.01 micron or less. This is truly outstanding.

There are a large number of other considerations involved. For example, an optional cylinder lens 15 (dotted lines) may be used to form the interference pattern, in which case its focal length replaces R in the above equations, if it is located between the slit and screen. While adding experimental complication, use of a lens insures that a Fraunhofer type pattern will be formed even at large values of *w*, and that the pattern will remain stationary in space regardless of changes in position of the slit width centerline.

Further, the interference pattern is generated by waves diffracted from each boundary which coherently combine to form a fringe pattern proportional to edge separation. These boundary waves are propogated in a plane lying locally perpendicular to the edge and laser beam, and for meaningful pattern fringes to be generated in a FIG. 1 type device, it is required that the planes of propagation from each edge be more or less parallel, say to within ± 5°. This restricts the technique as shown in FIGS. 1 and 2 to the checking of nearly straight edges. Contoured reference edges can be used however (FIG. 7) as can lensing techniques which allow grossly divergent edge wave propagation directions to be employed.

Still further, the range of profile deviation relative to a straight edge depends on the largest value of slit width whose pattern can accurately be discerned, noting from equation 3 that fringes become increasingly fine spaced as w increases. While w values of a few centimeters have been successfully employed, a much more typical maximum value is 4 mm, using visible wavelengths.

While accurate measurement cannot occur simultaneously in the true sense of the word, it can be accomplished much faster using the invention than with ordinary means, a necessity in applications such as described relative to FIG. 5 below. In addition, the pattern profile is for all intents and purposes simultaneous in regard to qualitative visual determination of relative magnitudes (especially departures from straightness) as well as when photographic records are made. These records may be taken dynamically, using a movie camera, stroboscopic laser illumination or the like, or statically for example, on simple Polaroid film — a very big advantage for the stress analysis researcher. Film allows one to capture a diffractographic representation of the object profile in an essentially simultaneous manner, allowing later fringe location determination "off-line."

It should be noted that changes in object profile can be monitored due to causes other than applied forces. For example, the effects of wear, shrinkage, growths, coatings, and the like can all be monitored in this fashion.

Figure 4:
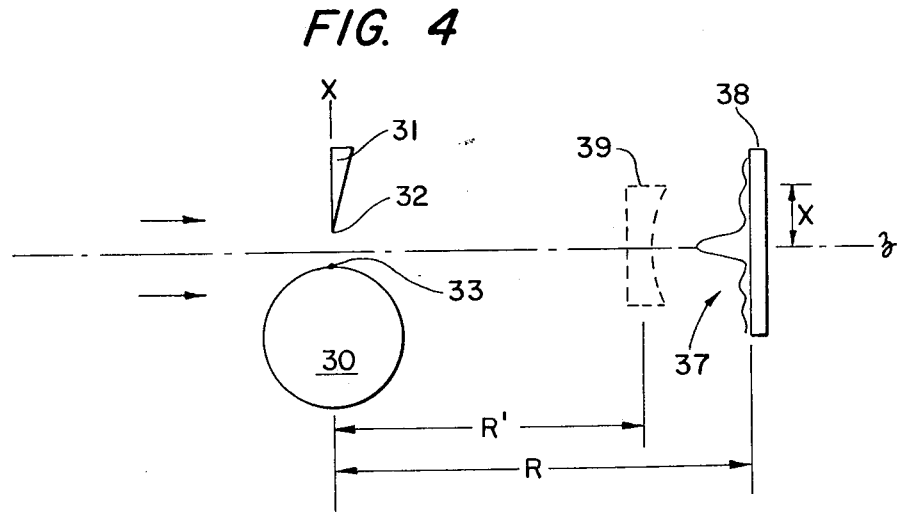
FIG. 4 is a diagrammatic side elevation view of a portion of the embodiment of FIG. 3.

FIGS. 3 and 4 depict an embodiment of the invention similar to that of FIGS. 1 and 2 which obtains an interference pattern proportional to the profile of a manufactured object relative to a master or desired profile. The set-up is virtually identical to that described above for obtaining before and after conditions of a member, except that rather than compare two patterns produced using the same member, comparison is made between patterns produced between test and master members, the latter's pattern being obtainable theoretically if desired.

With reference to FIGS. 3 and 4, a tapered roller bearing 30 is placed adjacent object 31 with straight edge reference boundary 32, the point of tangency 33 of the cylindrical surface of the bearing relative to the incident radiation from He-Ne gas laser 34 forming the required diffraction wave producing means. While the whole bearing/reference length could be illuminated, producing a profile interference pattern indicative of bearing taper similar to the pattern of FIG. 1, this embodiment utilizes positive cylinder lens 35 to focus incident radiation to a line 36 in the region of the diffracting boundaries. In this case the diffraction pattern 37 produced on ground glass screen 38 represents but a small length of bearing 30, a length magnified several thousand times on the screen, if desired. Thus, the interference pattern 37 provides a microprofile of the small bearing region illuminated, and for comparison purposes it is useful to consider the effective magnification obtained in the x, or diffraction, direction so that a comparison may be made with other techniques.

The x magnification of the system can be obtained from equation (6) and is $$M = x_b/w_a \quad (10)$$

where M usually ranges from $10^2$ to $5 \times 10^3$ in most experiments. Interestingly, it is wavelength independent, implying that infra red (eg. $CO_2$ laser) sources may be used with equal results. In addition, by placing optional cylinder lens 39 (dotted lines) into the pattern after it has formed (ie. at a distance $R' >> w$), an additional amount of parallax-free magnification by geometrical means may be obtained. In other words, using the technique, a projected profile diffraction pattern may be generated having a magnification of several thousand in both x and y directions. This compares very favorably with existing microscopic devices, espcially when one considers that there is no depth of field and focusing problems, at least in the x direction. Boundary surface roughness becomes very visible under these magnifications.

From equation (10), it is apparent that as w increases, magnification decreases, thereby limiting the range over which such high magnifications can be maintained. However, this mainly effects resolution, not accuracy, because while fringes move less with a given change in w, for larger initial slit widths, the accuracy with which one can locate a particular fringe minima increases. Thus, generally the same error in w is maintained, assuming the small fringes resulting from large w can be resolved.

A problem with visual interpretation of the patterns is the confusion generated by the many orders present. Thus, where possible, it is often desirable in practice to display on screen 38 only the first or second order, since counting out each time to the tenth order, for example, is too difficult for rapid measurement. This is particularly the case if a template is located on the screen, marked off with tolerances from the fringe location of a master profile.

Where more magnification is desired to enable the operator to see profile changes with the unaided eye, several other possibilities remain. For example, R may be increased to increase x, or equivalently a cylinder lens such as 39 may be used. A more elegant technique is shown however in FIGS. 3 and 4. If an argon laser 40 of wavelength 4,880 A. is used to simultaneously illuminate the boundaries, for example by means of beam splitter 41 shown in dotted lines, then the composite two-wavelength pattern has obscured all minima of the pattern produced by the He-Ne gas laser of wavelength 6,328 A., except those in multiples of 7. This occurs since the ratio of the two laser wavelengths is almost exactly 7/9. Thus a non-confusing profile diffraction pattern may be viewed using the seventh (or 14th etc.) order, increasing magnification by a factor of 7 over the first order for any given slit width w. Obviously, other light sources could be chosen to give different combinations.

Another technique to improve resolution is to use a filter such as 13 above placed against screen 38. In this case the filter pattern would be recorded from that produced by a master profile, and the moire fringes formed would indicate changes therefrom. This allows very fast tolerance checking, because the more moire fringes which appear, the more the part deviates from the master.

A final technique is to dispense with screen 38 and let the interference pattern fall on television camera 42 whose electronics 43 can produce a greatly enlarged image on receiver screen 44. A template 45 can be used thereon to indicate profile. The electronic circuitry can also compensate for non-linear nature of equation (6) for example by scanning the pattern at a constant rate, producing a quasi-digital frequency output proportional to fringe spatial frequency f, allowing equation (9) to be used, and with sufficient computing capability the operation can be fully automatic, if desired. In other words the profile interference pattern can be compared to an electronically stored master pattern and the errors quantified in essentially real time.

I have found that a wide variety of boundary shapes and materials can be used to produce satisfactory diffraction patterns of the type required by the invention. While differences have been observed between boundary waves from various object shapes (e.g., a razor blade vs. a 20 cm diameter polished roller), the interference fringes have always been usable, at least in some regions, with their locations satisfying the simple equations above.

It is noted in passing that the diffractographic "image" of the object surface is symmetric, both about the $\theta = 0$ axis and about each minima position (within a negligibly small error). This is contrasted with the asymmetric and less accurately detectable image produced by standard optical projectors.

Another embodiment of the invention usable for profiling sheet material on-line in steel mills and other installations is shown in FIGS. 5 and 6. Here a sheet of material 60 moving in the direction shown, is tensioned around cylindrical roller 61. A beam from laser 62 is directed along a tangent to the sheet such that the sheet boundary 63, together with reference boundary 64 of object 65 each diffract incident radiation to form interference pattern 66. To obtain essentially instantaneous operation capable of stopping the motion of the sheet material to a sufficient degree, high speed rotating mirror or electro-optical beam scanner 67 is utilized to scan the beam across the sheet. The interference pattern sequentially resulting from each position on the sheet is focused by cylinder lens 68 onto linear detector array 69, for example a Reticon Corp. 256D, having a 256 photodiodes on 1 mil centers.

Like the TV camera of FIG. 3, the linear detector array circuitry may be programmed to determine $x_n$, $s$ or $f$ at each position across the sheet which can be reliably indicated by the drive circuitry of the scanner mechanism, typically 400 positions. Profile information is thus generated, though for pattern fringe positions to be relatable to sheet thickness, it is essential that the roll surface be a constant or at least known distance away from the reference edge and that the sheet contact the roll at all points. If these conditions are satisfied, then a sheet thickness profile at any instant of time can be obtained by illuminating locations along the sheet width (in the $y$ direction out of the paper) and analyzing each interference pattern to obtain $w_b - w_a$, $w_c - w_a$, etc.

Because of the very high speeds of some processes, the time involved to scan and compute $x$, $s$ or $f$ using even high speed linear array scanners or TV cameras may be too long unless just a few detector elements are scanned. Of considerable utility therefore is the quasi-digital off-axis detection technique disclosed in my co-pending application Ser. No. 233,421, filed May 15, 1972, wherein a detector 70 at an angle $\theta_d$ in the diffraction pattern counts the number of fringes passing its face, in this case as w changes due to sheet thickness as the laser beam is swept down the slit. When a second detector is used in conjunction with the technique described in the referenced application, bidirectional signals are obtained which indicate whether the counter 71 should add or subtract the fringe counts corresponding to depressions and humps in the sheet material. Therefore, if a zero count corresponds to the edge of the sheet where the sweep begins, the number of counts at any given location across the sheet gives the profile deviation from the edge. The counting and comparison (to stored tolerence values) circuitry required can be extremely fast.

The sheet width which can be checked in this manner is limited to the width of the cylinder lens, concave mirror, fiber optic bundle or other means used to collect the diffracted radiation. Thus about one meter sheet is perhaps the limit for the apparatus, beyond which one could use separate systems for different sections of the sheet, or the like.

Finally, it is often advisable to move reference boundary 64 to the position 72 noted in dotted lines. The resulting "z-factor" type pattern is perfectly usable, and welcome clearance is provided between reference and sheet, preventing damage should spurious jumps of the sheet occur.

Figure 7:
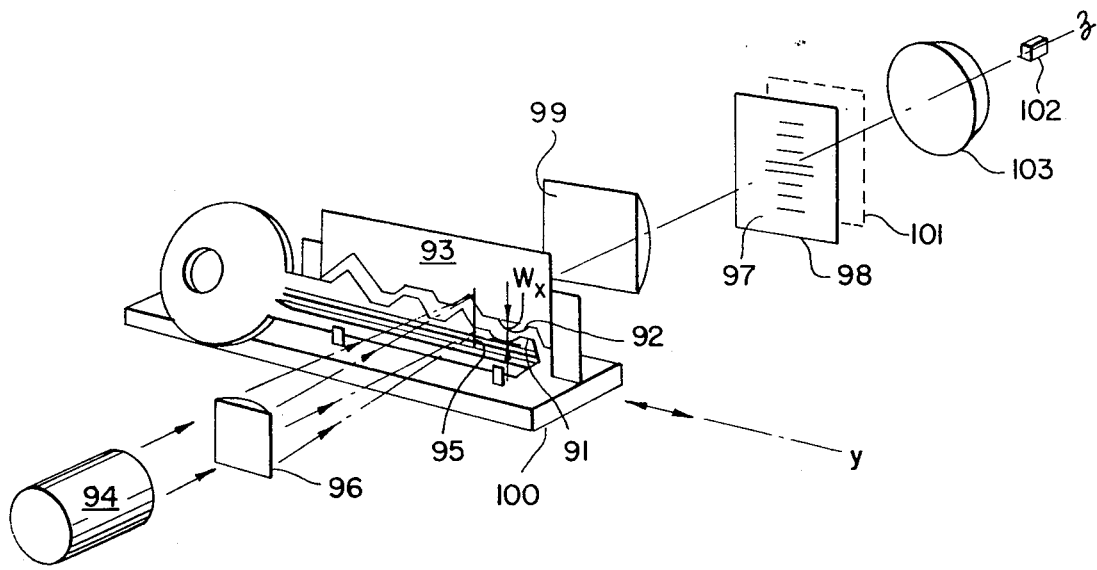
FIG. 7 is a diagrammatic perspective view of an embodiment of the invention whereby objects with arbitrary profiles may be gaged.

Other detection schemes, such as the filter arrangement of FIG. 7 can also be used, for example with a separate detector and filter interference pattern at each desired position across the sheet.

The disclosed system represents the only known practical method of accurately measuring, on-line, small profile changes including flaws in sheet produced by high speed rolling mills and other similar installations. Obviously mill rollers themselves may be profiled as well, either on or off line, if desired. In addition, a wide variety of materials may be so profiled, including paper, plastics, textiles, film, magnetic tape, aluminum and other metals etc.

The high speed type detection means outlined relative to FIGS. 5 and 6 may be used to determine profiles of objects moving on conveyor belts or the like since the detection process is so fast that the motion of the object is effectively stopped (within some small error). Consider for example that the roll 61 in FIGS. 5 and 6 is a cylindrical object such as a cartridge moving on a conveyor in the $x$ direction (upwardly in the sense of FIG. 6). Using the z-factor positioned reference boundary 72, the object can effectively move past without difficulty. At some time, for example when the width is w as shown, the laser beam is swept down the object, and profile obtained just as in FIGS. 5 and 6. It is of course preferable to have two stations in simultaneous operation and diametrically opposed, so that diameter can be profiled, and movement errors cancelled out.

The foregoing embodiments illustrate objects which have nearly straight profiles. Clearly this is the simplest case, and allows production of a line-type interference pattern in the $y$ direction, since diffraction from each edge position occurs only in the $x$ $z$ plane, or at least nearly so. In other words, a line interference pattern "profile image" is produceable because waves from each location $y$ do not interfere with those from any other location (within a negligibly small error).

While a large number of industrially important objects have such nearly straight edges, there are many non-linear profiles which are also of interest. Some of these can be checked using the invention using different boundary and optical arrangements as is now discussed.

The first case is the use of a reference boundary whose shape matches that of the object tested, such that both object boundary and reference are locally parallel or nearly so at all locations. For example, if an arc-like edge profile is compared to a similarly contoured reference edge, arc shaped interference fringes (whose location along any radius is predicted by equation 3, where $w$ is the edge separation along the same radius) are produced at angles $\theta$ increasing from the arc center of rotation when the whole slit circumference is irradiated. At angles $\theta$ toward the center however, diffraction waves from different arc locations overlap, producing a generally useless pattern on that side.

Simultaneously produced, one sided, arc-type "line" interference patterns can be produced over the region of any curved boundary which does not contain more change in slope and a large number of objects (or important sections thereof) are thus profilable in this manner, including gear teeth, screw threads, arches and other structural shapes, cam lobes and other machined or molded parts of every description, including lobes of the key shown in FIG. 7. From an optical point of view however the situation is somewhat more complicated than the straight edge symmetric case, since more involved or less efficient means than the simple cylinder lens of FIG. 1 must be used to illuminate the curved boundaries of reference and object, and interference pattern detection must occur in various directions on radaii perpendicular to a curving aperture axis and constrained to one side of the pattern.

Because of the above considerations it is often advantageous to scan the laser beam and detection system along the aperture, producing a pattern proportional to the separation at a single aperture location at any one time rather than a more complicated, one-sided pattern indicative of $w$ values at all locations. Obviously, the laser/detection means can remain fixed with the aperture scanned past it, and a special case of this is now illustrated.

As shown in FIG. 7, the profile of an object, in this case a key 90 with boundary 91 placed relative to a master edge 92 on object 93, is obtained. Laser beam 94 is focussed to a fine strip 95 (typically 0.05 mm wide) by cylinder lens 96 onto the aperture formed between key and master edge producing an interference pattern 97 on screen 98 in the focal plane of optional cylinder lens 99 used to form the pattern. Since pattern fringe positions are proportional to the separation $w_x$ between the points of intersection of the focal line and the key and master edge respectively, the master is constructed such that the master edge has an equal separation $w_x$ everywhere with respect to a perfect key. This approach is not the same as the more obvious case where a perfect key and master have parallel edges, and is chosen in this case to provide a constant interference pattern on screen 98 when the test key/master edge combination is scanned in the $y$ direction past the focal line by transport 100. It is noted that the interference pattern remains fixed in space because of the well known properties of Fraunhofer type patterns formed by a lens.

Since the diffraction pattern produced by a perfect key relative to the master edge is constant over the scan, this pattern can be used as a reference. As shown, a negative of the pattern is located at position 101 and the light passing through is imaged on detector 102 by lens 103. Changes in $w$ from the perfect edge/master case can be detected to less than 0.1 micron by this technique, over a range of at least 20 microns.

What is claimed is:

1. A method of determining the profile of an object boundary comprising the steps of:

providing an elongate reference diffraction wave producing means having a known spatial configuration;

providing a member having an elongate object boundary diffraction wave producing means spaced from said elongate reference diffraction wave producing means such that an elongate gap is provided therebetween;

directing electromagnetic radiation at a first discrete portion of said object boundary diffraction wave producing means and at a first discrete portion of said reference diffraction wave producing means to form a first, single, interference pattern caused by interaction of waves diffracted from said reference diffraction wave producing means and said object boundary diffraction wave producing means;

directing electromagnetic radiation at a second discrete portion of said object boundary diffraction wave producing means and at a second discrete portion of said reference diffraction wave producing means, said second discrete portions being spaced longitudinally from said first discrete portions along the elongate object boundary diffraction wave producing means and reference diffraction wave producing means, respectively, to form a second, single, interference pattern caused by interaction of waves diffracted from said reference diffraction wave producing means and said object boundary diffraction wave producing means;

and determining from said first and second single interference patterns the profile of said object boundary.

2. A method according to claim 1 wherein said directed electromagnetic radiation is passed through a cylinder lens.

3. A method according to claim 1 wherein said electromagnetic radiation is focussed to a line on at least one of said reference diffraction wave producing means and said object boundary diffraction wave producing means.

4. A method according to claim 1 wherein said first and second interference patterns are formed simultaneously.

5. A method according to claim 4 wherein said electromagnetic radiation is passed through a cylinder lens positioned to direct said electromagnetic radiation simultaneously onto said first and second discrete portions of said object boundary diffraction wave producing means.

6. A method according to claim 1 wherein said reference diffraction wave producing means comprises a non-linear boundary of an object.

7. A method according to claim 1 wherein a beam of electromagnetic radiation is moved along said object boundary to sequentially direct electromagnetic radiation of said beam at said first and second discrete portions of said object boundary diffraction wave producing means.

8. A method according to claim 1 wherein said step of comparing said first and second, single, interference patterns comprises determining the spatial position of a portion of said first, single, interference pattern, and comparing that spatial position with the spatial position of a portion of said second, single, interference pattern.

9. A method according to claim 1 wherein said electromagnetic radiation comprises electromagnetic radiation of at least two discrete wave lengths.

10. A method according to claim 1 including the further step of forming said first and second interference patterns on a member upon which are provided corresponding interference patterns produced on said member at a time when said reference diffraction wave producing means was separated a known distance from said object boundary diffraction wave producing means.

11. Apparatus for determining the profile of an object boundary comprising:
    an elongate reference diffraction wave producing means having a known spatial configuration;
    elongate object boundary diffraction wave producing means spaced from said elongate reference diffraction wave producing means such that an elongate gap is provided therebetween;
    means for directing electromagnetic radiation at said reference diffraction wave producing means at a first discrete portion of said object boundary diffraction wave producing means and at a first discrete portion of said reference diffraction wave producing means to form a first, single, interference pattern caused by interaction of waves diffracted from said reference diffraction wave producing means and said object boundary diffraction wave producing means;
    means for directing electromagnetic radiation at said reference diffraction wave producing means at a second discrete portion of said object boundary diffraction wave producing means and at a second discrete portion of said reference diffraction wave producing means, said second discrete portions being spaced longitudinally from said first discrete portions along the elongate object boundary diffraction wave producing means and reference diffraction wave producing means, respectively, to form a second, single, interference pattern caused by interaction of waves diffracted from said reference diffraction wave producing means and said object diffraction wave producing means; and
    means for determining from said first and second, single, interference patterns the profile of said object boundary.

12. Apparatus according to claim 11 including cylinder lens means for directing electromagnetic radiation at said reference diffraction wave producing means and said object boundary diffraction wave producing means.

13. Apparatus according to claim 11 including means for focussing said electromagnetic radiation to a line on at least one of said reference diffraction wave pattern means and said object boundary diffraction wave producing means.

14. Apparatus according to claim 11 wherein said first and second interference patterns are formed simultaneously.

15. Apparatus according to claim 11 wherein said reference diffraction wave producing means comprises a non-linear boundary of an object.

16. Apparatus according to claim 11 further including means for forming a beam of electromagnetic radiation and means to move said beam of electromagnetic radiation to sequentially direct electromagnetic radiation of said beam at said first and second discrete portions of said object diffraction wave producing means.

17. Apparatus according to claim 11 further including means for determining the spatial position of a portion of said first, single, interference pattern and means for determining the spatial position of a portion of said second, single, interference pattern.

18. Apparatus according to claim 1 further including means for enlarging an interference pattern caused by interaction of waves diffracted from said reference diffraction wave producing means and said object diffraction wave producing means.

19. Apparatus according to claim 1 wherein said electromagnetic radiation directing means comprises means for producing electromagnetic radiation of at least two discrete wavelengths.

20. Apparatus according to claim 11 including means for fixing the position of said reference diffraction wave producing means relative to said electromagnetic radiation directing means.

21. A method according to claim 1 wherein said reference diffraction wave producing means is fixed relative to the interference patterns produced.

22. Apparatus according to claim 11 including means for comparing said first and second interference patterns and means for fixing the position of said reference diffraction wave producing means relative to said interference pattern comparing means.

23. Apparatus according to claim 11 including means for detecting said interference pattern, said detecting means being displaced from said gap a distance much greater than the distance across said gap.

24. A method according to claim 1 wherein said first and second interference patterns are displayed on a member fixed in space relative to said reference diffraction wave producing means.

25. Apparatus according to claim 11 including means for displaying said first and second diffraction patterns on a member fixed in space relative to said reference diffraction wave producing means.

26. A method according to claim 1 wherein said interference patterns are recorded on a photosensitive member.

27. Apparatus according to claim 11 wherein said reference diffraction wave producing means and object boundary diffraction wave producing means are spaced a distance in the direction of propogation of said electromagnetic radiation.

28. A method according to claim 1 wherein said object boundary diffraction wave producing means is located on a surface moving in the direction of propogation of said electromagnetic radiation.

29. Apparatus according to claim 11 wherein said object boundary diffraction wave producing means comprises the surface of a member moveable in the direction of propogation of said electromagnetic radiation and including means for moving said member in said direction.

30. A method according to claim 1 wherein said object boundary diffraction wave producing means is moveable in a direction substantially perpendicular to said elongate gap.

31. Apparatus according to claim 27 including means for moving said object boundary diffraction wave producing means in a direction substantially perpendicular to said elongate gap.

32. Apparatus according to claim 11 wherein said reference diffraction wave producing means comprises a member having two elongate object boundaries.

33. Apparatus according to claim 32 wherein said reference diffraction wave producing means comprises a wire or slit.

34. Apparatus according to claim 11 including photoelectric means for detecting said interference patterns.

35. Apparatus according to claim 34 wherein said photoelectric means comprises photoelectric detector means located at a fixed angular position with respect to the axis of symmetry of said interference patterns.

36. Apparatus according to claim 35 wherein said detector means comprises two adjacent detectors disposed colinearly with said interference pattern and centered about the location of said detector means.

37. Apparatus according to claim 34 wherein said photoelectric means comprises a television camera.

38. Apparatus according to claim 34 wherein said photoelectric means comprises a line scan photodiode array.

* * * * *